United States Patent
He et al.

(10) Patent No.: US 12,328,753 B2
(45) Date of Patent: Jun. 10, 2025

(54) LOGICAL CHANNEL PRIORITIZATION FOR DATA

(71) Applicant: QUALCOMM Incorporated, San Diego, CA (US)

(72) Inventors: Linhai He, San Diego, CA (US); Yuchul Kim, San Diego, CA (US); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 17/813,018

(22) Filed: Jul. 15, 2022

(65) Prior Publication Data

US 2024/0023155 A1    Jan. 18, 2024

(51) Int. Cl.
*H04W 72/543* (2023.01)
*H04W 72/21* (2023.01)
*H04W 72/566* (2023.01)

(52) U.S. Cl.
CPC ......... *H04W 72/543* (2023.01); *H04W 72/21* (2023.01); *H04W 72/569* (2023.01)

(58) Field of Classification Search
CPC . H04W 72/543; H04W 72/569; H04W 72/21; H04W 24/08; H04W 24/10; H04L 43/06; H04L 43/0852; H04L 43/0858; H04L 41/5022
See application file for complete search history.

(56) References Cited

U.S. PATENT DOCUMENTS

| | | | | |
|---|---|---|---|---|
| 2013/0322349 A1* | 12/2013 | Hosangadi | ............. | H04L 5/006 370/329 |
| 2018/0184312 A1* | 6/2018 | Yi | ........................ | H04L 43/0858 |
| 2019/0141550 A1* | 5/2019 | Yi | ........................ | H04W 24/08 |
| 2022/0116959 A1* | 4/2022 | Li | ........................ | H04W 76/14 |
| 2024/0015577 A1* | 1/2024 | Kang | ................ | H04W 28/0231 |

FOREIGN PATENT DOCUMENTS

| WO | 2021030561 A1 | 2/2021 |
|---|---|---|
| WO | 2021163527 A1 | 8/2021 |
| WO | 2021207464 A1 | 10/2021 |

OTHER PUBLICATIONS

International Search Report and Written Opinion—PCT/US2023/025281—ISA/EPO—Oct. 9, 2023.

* cited by examiner

*Primary Examiner* — Rushil P. Sampat
(74) *Attorney, Agent, or Firm* — Procopio, Cory, Hargreaves & Savitch LLP

(57) ABSTRACT

A UE receives a configuration indicating priority levels for each of multiple logical channels. The UE schedules one or more packets for uplink transmission according to a priority level of a logical channel associated with a respective packet of the one or more packets and adjusts scheduling in response to a residual delay budget of a packet exceeding a delay threshold. The UE transmits the uplink transmission.

26 Claims, 10 Drawing Sheets

LOGICAL CHANNEL PRIORITIZATION FOR DATA

TECHNICAL FIELD

The present disclosure relates generally to communication systems, and more particularly, to wireless communication include logical channel prioritization.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives a configuration indicating priority levels for each of multiple logical channels. The apparatus schedules one or more packets for uplink transmission according to a priority level of a logical channel associated with a respective packet of the one or more packets and adjusts scheduling in response to a residual delay budget of a packet exceeding a delay threshold. The apparatus transmits the uplink transmission.

In an aspect of the disclosure, a method, a computer-readable medium, and an apparatus are provided. The apparatus configures priority levels for each of multiple logical channels and configures delay thresholds for each of the multiple logical channels, the delay thresholds being based on a residual delay budget. The apparatus receives communication from a user equipment (UE) based on the priority levels and the delay thresholds.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
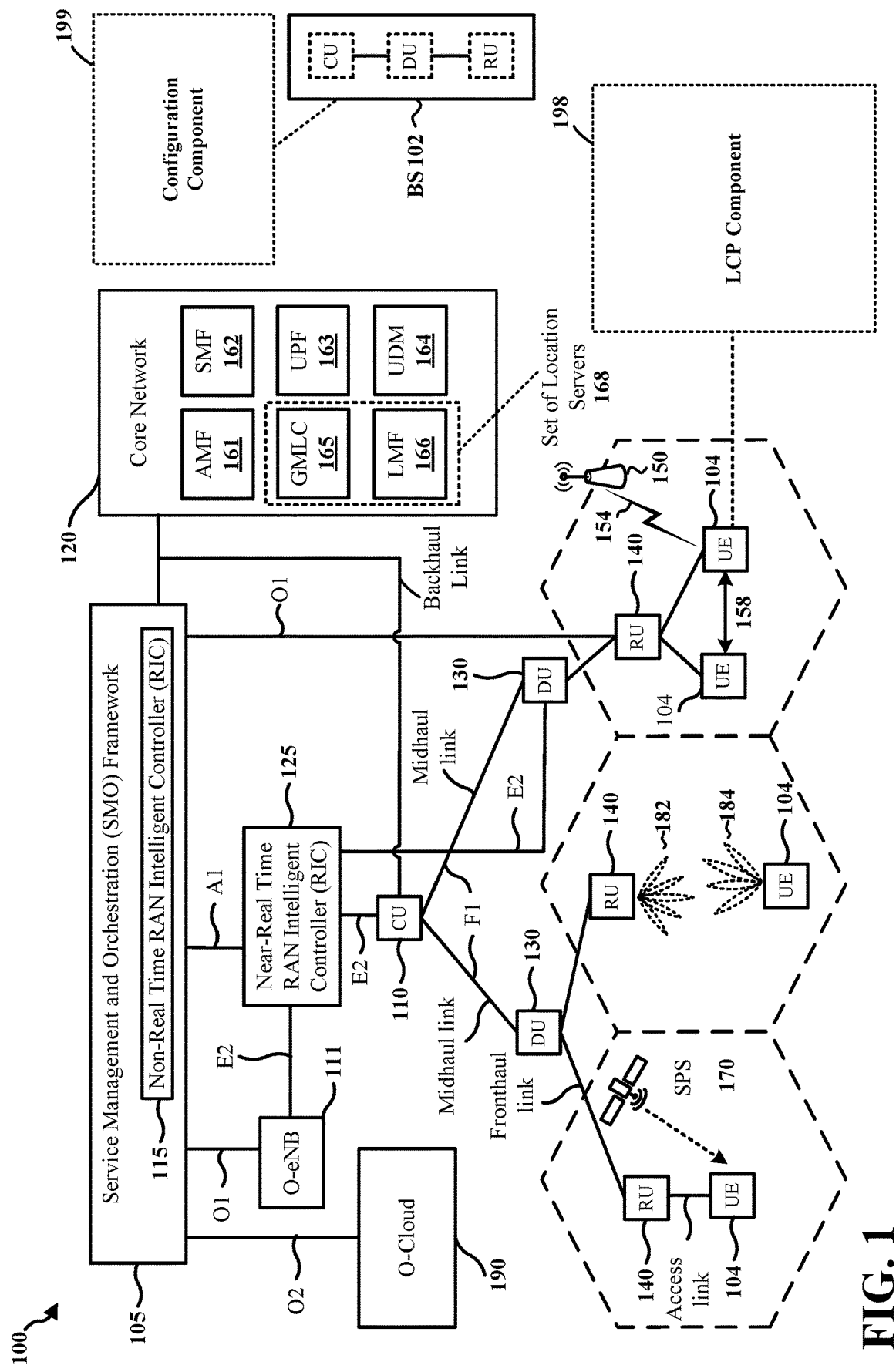
FIG. 1 is a diagram illustrating an example of a wireless communications system and an access network.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network.

The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include an LCP component 198 that is configured to receive a configuration indicating priority levels for each of multiple logical channels, schedule one or more packets for uplink transmission according to a priority level of a logical channel associated with a respective packet of the one or more packets, and adjust scheduling in response to a residual delay budget of a packet exceeding a delay threshold. The UE may also be configured to transmit the uplink transmission.

In certain aspects, the base station 102 may include a configuration component 199 that configures priority levels for each of multiple logical channels and configures delay thresholds for each of the multiple logical channels, the delay thresholds being based on a residual delay budget. The base station may be further configured to receive communication from a UE based on the priority levels and the delay thresholds. Although the following description may be focused on 5G NR, the concepts described herein may be applicable to other similar areas, such as LTE, LTE-A, CDMA, GSM, and other wireless technologies.

Figure 2:
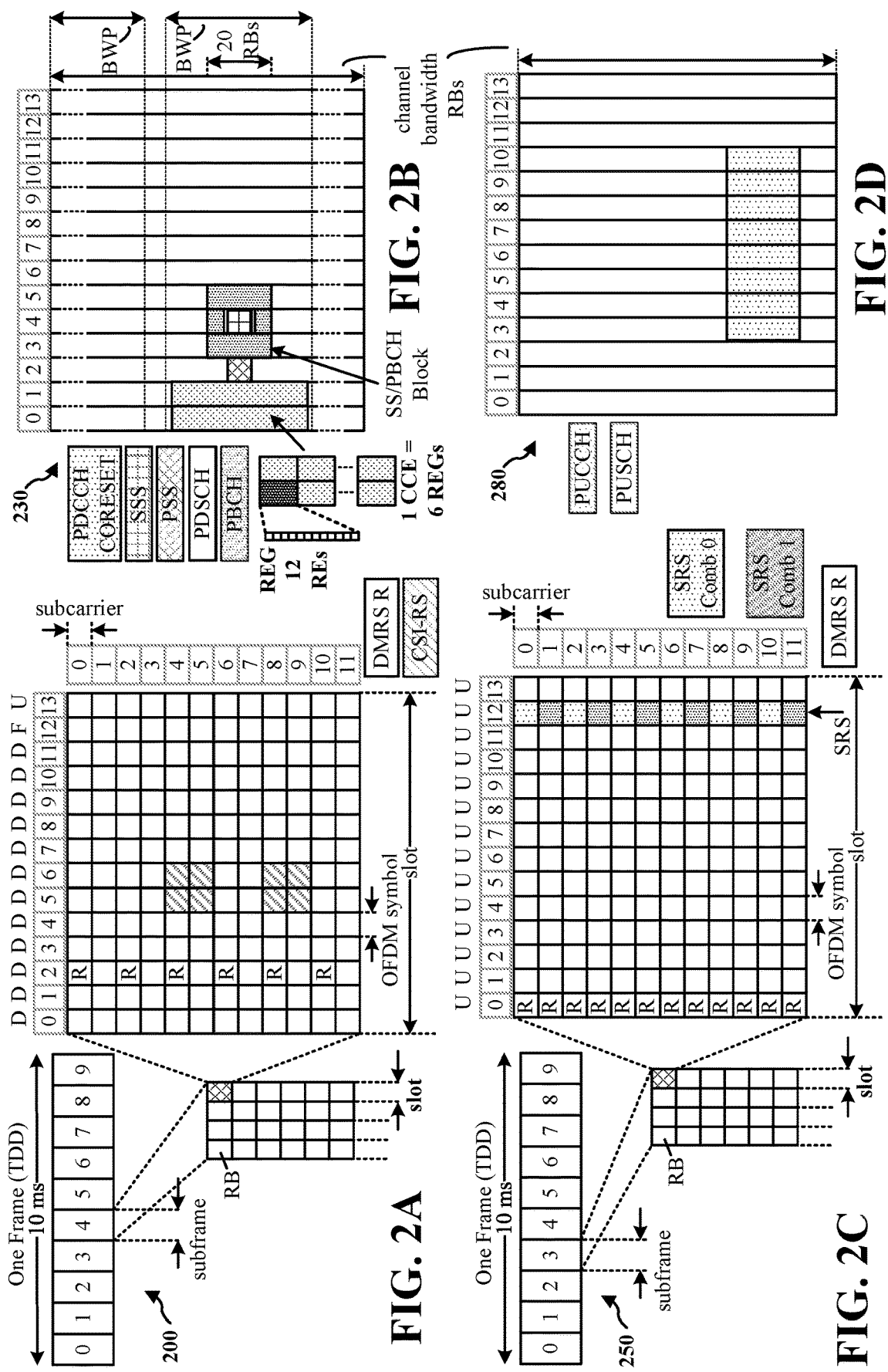
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS<br>$\Delta f = 2^\mu \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where y is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
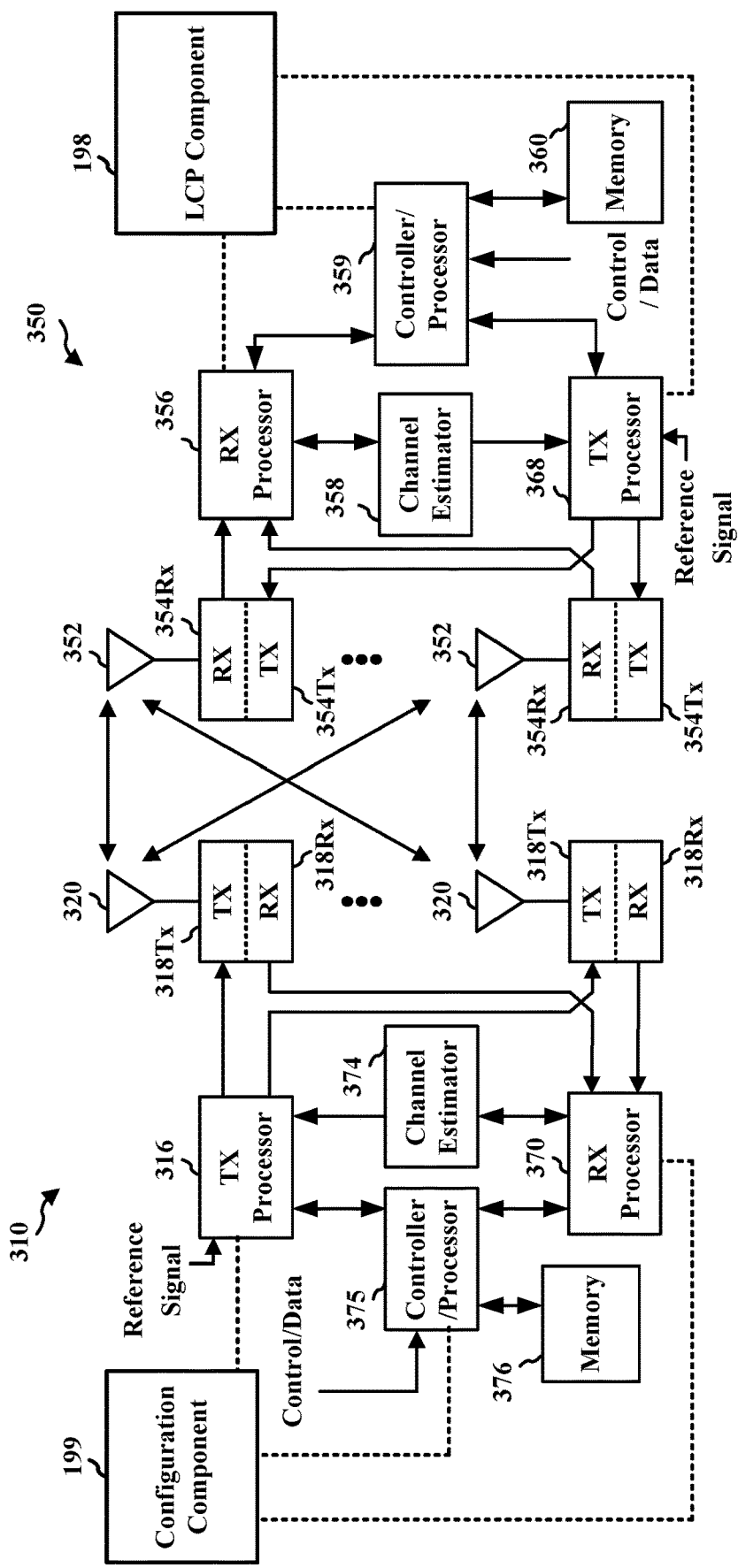
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the LCP component 198 of FIG. 1.

At least one of the TX processor 316, the RX processor 370, and the controller/processor 375 may be configured to perform aspects in connection with the configuration component 199 of FIG. 1.

When a UE receive an uplink grant from the network (e.g., from a base station), the UE determines how to use (e.g., split) the granted resources for data from different logical channels. The UE may be configured with multiple logical channels (LCHs) and may have data associated with one or more of the LCHs for transmission at a time when the UE has an allocation of uplink resources. The UE may use a logical channel prioritization (LCP) procedure to share resources for uplink transmission among LCHs. The LCP procedure may control how the UL-SCH resources are shared among the LCHs, for example. The LCHs may be served based on different priorities among the LCHs. Each of the LCHs may be configured with a scheduling priority, and data packets from the different LCHs may be scheduled in uplink resources based on the scheduling priority of the corresponding LCH associated with the data packets. For example, packets for a higher priority LCH may be scheduled prior to packets from a lower priority LCH. In some aspects, the priority based LCP may be referred to as being based on strict priority, e.g., in which the LCH with the highest priority is served first and the LCH of the second highest priority is not served until the LCH with the highest priority no longer has buffered data. Similarly, the LCH with a priority lower than the second highest priority is not served until the LCH with highest priority and the LCH with the second highest priority no longer have buffered data.

Some applications may generate multiple types of uplink flows of data. Different flows may have different timing deadlines. For example, different data flows for the same application may have different packet delay budgets. A non-limiting example of such an application is an extended reality (XR) application (e.g., or similarly a virtual reality (VR) application or augmented reality application) or a different type of cloud-type gaming application. In an XR example, the XR application may generate pose or control packets of information that may have a packet delay budget of 4 ms, and which may arrive for transmission (e.g., be generated) with a period of 10 ms. Such pose data may be based on movement of a user's head, a user's field of vision, etc. For example, the application may sample the head position every 10 ms and generate an update to send to the other end of the application (such as a cloud-based server). The XR application may also generate hand gesture tracking information to track movement of a player's hand, and which may have a longer packet delay budget of 10 ms and may arrive for transmission every 40 ms (e.g., with a period of 40 ms). The XR application may generate voice or audio for transmission, which may have a longer delay budget of 15 ms and may arrive for transmission with a period of 20 ms. In this example, the XR application may generate different flows of traffic that may have different packet delay budgets and different generation periods.

If a single LCH has a short deadline, e.g., a short packet delay budget, an LCP based on priority (e.g., strict priority based LCP) may enable the transmissions within the deadline. For example, if the LCHs are for audio and web data or for URLLC and eMBB a scheduling priority based LCP may be used with a highest priority assigned to the LCH for the data having the shorter time deadline.

However, the XR application example shows that there may be multiple flows having various levels of packet delay budgets. Aspects presented herein enable scheduling based on priority to be used while also serving a PDU in a lower-priority LCH that has been buffered so that its delay is getting close to its deadline so that the lower-priority LCH may be served before a packet for a higher-priority LCH. Aspects presented herein provide a scheduling priority for LCHs of different priorities that consider residual delay budget rather than scheduling based on fixed priorities. As an example, the scheduling priority for XR traffic may be based on residual packet delay budget, instead of fixed priorities assigned to the flows.

Figure 4:
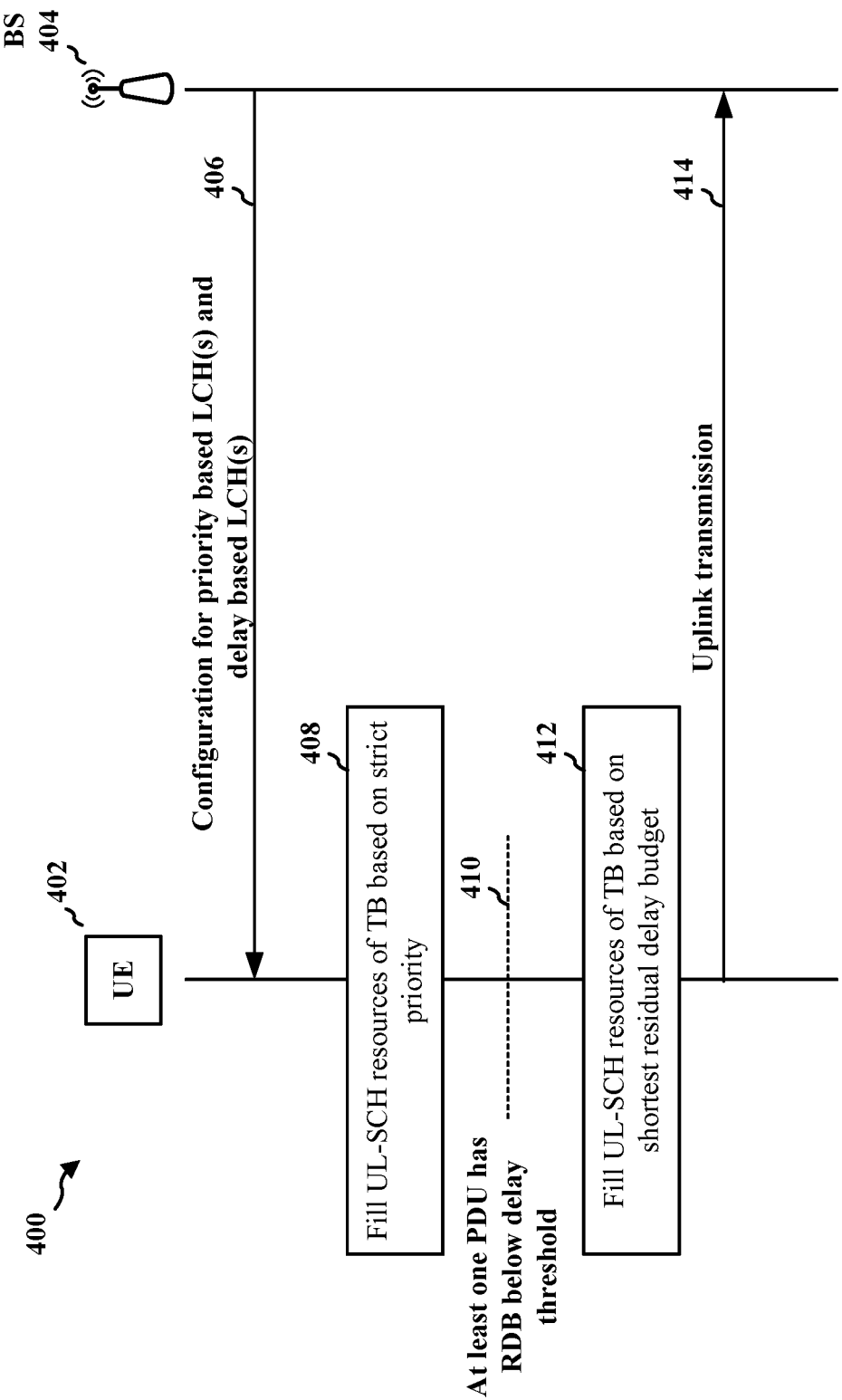
FIG. 4 illustrates an example communication flow in which a UE fills UL-SCH resources in a TB based on a LCP that includes switching between strict priority and a delay based prioritization.

FIG. 4 illustrates an example communication flow 400 with LCP based, at least in part, on a time deadline. The LCP may be referred to as a deadline based LCP. The network can configure at least a subset of LCHs for deadline based scheduling FIG. 4 illustrates that a base station 404 may configure, at 406, a UE 402 with a priority level for each of multiple LCHs and may further configure a delay threshold for at least a subset of the LCHs. The network may configure each of the subset of LCHs with a delay threshold to be applied to a PDU's residual delay budget (RDB). The UE 402 may compare the residual delay budget for each PDU buffered for the LCH to the delay threshold. Each LCH, e.g., including the subset of LCHs and any additional LCHs, may be configured with an LCH scheduling priority to be used for LCP. A UE may then schedule the transmission of data from the different LCHs based on priority and based on delay deadlines, as shown at 408 and 412.

For example, if no packets in the subset of deadline based LCHs have a residual delay budget that exceeds the corresponding delay threshold, each of the LCHs (e.g., including deadline based LCHs and any priority based LCHs) may be scheduled using a strict priority scheme (e.g., a priority based scheme that does not schedule based on delay). For example, the UE 402 may fill the UL-SCH resources of a TB with packets from one or more LCHs based on a strict priority procedure, as shown at 408.

If at least one packet in the subset of deadline based LCHs has a residual delay budget that exceeds the corresponding delay threshold, the UL-SCH resources in an available TB may then be filled according to a procedure in which LCHs with packets that have exceeded their delay thresholds are scheduled first. For example, in FIG. 4, at 410, at least one PDU has a residual delay budget below a threshold amount of time, and the UE may switch to filling the UL-SCH resources of the TB based on a shortest residual delay budget, at 412.

For example, among the buffered PDUs for one or more LCHs, the UE first selects the PDU with the smallest residual delay budget to fill the available TB. If resources are still available in the TB after the first PDU, then UE selects the PDU with the second smallest residual delay budget to fill the remaining resource in the TB. The UE continues selecting PDUs to fill the TB based on the PDU having the next smallest residual delay budget until each PDU having a residual delay budget that exceeds the corresponding delay threshold for the LCH of the PDU (e.g., until no PDUs have a residual delay budget that is less than their delay thresholds) or until the TB is completely filled with PDUs.

If there are remaining UL-SCH resources left in the TB after each PDU having a residual delay budget that exceeds the corresponding delay threshold has been applied to the TB, the UE schedules the remaining PDUs of LCHs based on a strict priority procedure, e.g., without considering the residual delay budget. For example, the UE 402 may switch between strict priority based filling of the TB and delay budget based filling of the TB based on whether a PDU has a residual delay budget that is less than the threshold delay. At 414, the UE transmits the uplink transmission, e.g., the TB in the UL-SCH resources.

Figure 5:
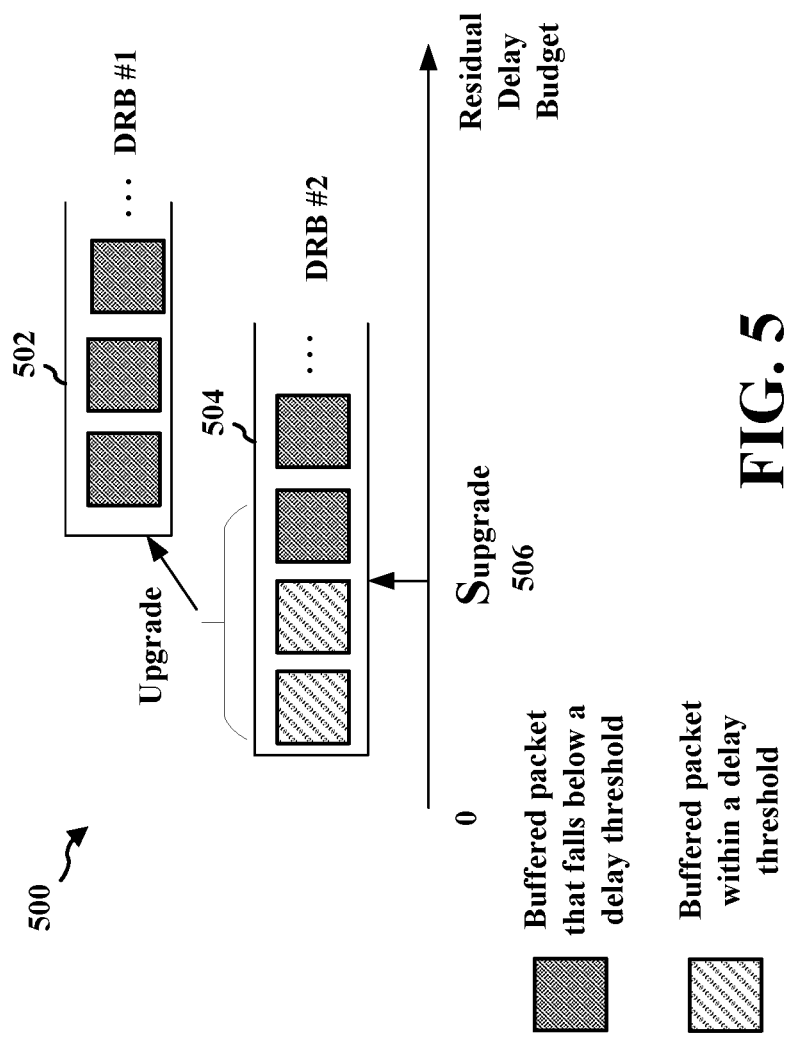
FIG. 5 illustrates an example of moving a packet to a higher level buffer in response to a residual delay budget falling below a delay threshold.

FIG. 5 illustrates an example 500 of a dynamic LCH priority for use in an LCP procedure. In the example in FIG. 5, a UE may use the strict priority procedure for filling PDUs in the UL-SCH resources of a TB, with an adjustment to upgrade the packet to a different buffer if the residual delay budget for the packet drops below the threshold. The queuing, e.g., buffers, may be for a MAC layer, an RLC layer, a PDCP, or a HARQ buffer. The PHY priority associated with the packet may also be upgraded (e.g., for the new DRB).

FIG. 5 shows packets buffered for data radio bearer (DRB) #2, which has a lower priority than DRB #1. Once the residual delay budget for the packets reaches a threshold, e.g., 506, the UE may move (or upgrade) the packets from the DRB #2 504 to the higher priority DRB #1 502.

Figure 6:
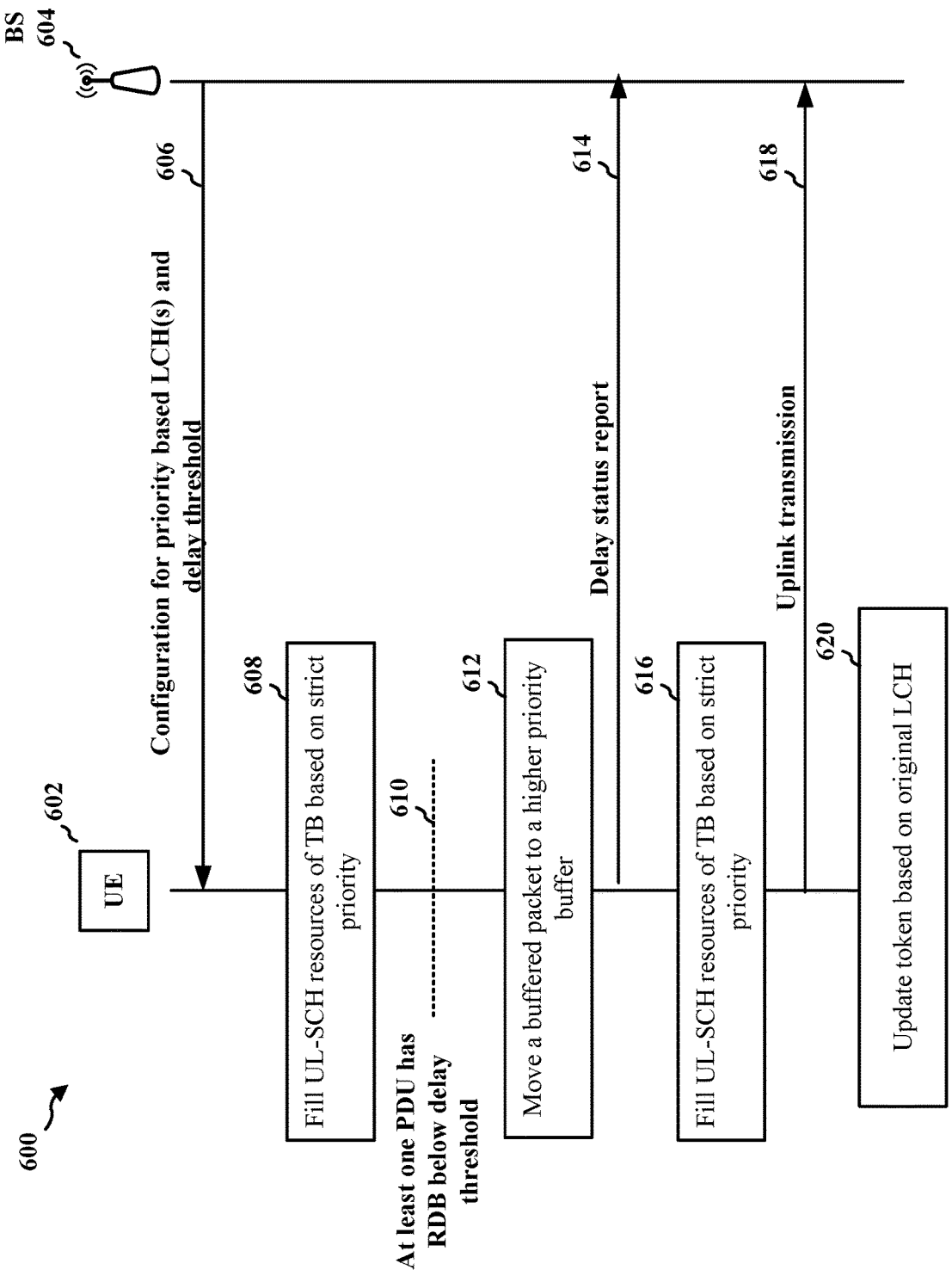
FIG. 6 illustrates an example communication flow in which a UE moves a packet to a higher level buffer in response to a residual delay budget falling below a delay threshold.

FIG. 6 illustrates an example communication flow 600 between a UE 602 and a base station 604. FIG. 6 illustrates that a base station 604 may configure, at 606, a UE 602 with a priority level for each of multiple LCHs and may further configure a delay threshold for at least a subset of the LCHs. As shown at 608 and 616, the UE may fill a TB with PDUs using a strict priority procedure. At 612, a PDU's residual delay budget falls below a delay threshold for its default data radio bearer (DRB), e.g., at 610, the UE may change the PDU to a different buffer, e.g., to a DRB having a higher priority rather than filling a TB without consideration to priority, at 616. The PDU may be queued in the new DRB according to its residual delay budget.

In some aspects, the change of the PDU to the different buffer, e.g., the "upgrade" to a higher priority DRB, may be a triggering condition that triggers the UE to transmit a delay status report. transmission of a delay status report, at 614.

In response to the transmission of a packet, at 618, the UE may update a token count, e.g., $B_j$ associated with a leaky bucket procedure, a token bucket procedure, etc., based on the packet's (e.g., PDU's) default LCH, not upgraded buffer, at 620. For example, a UE may maintain a token count as part of a traffic regulator operation, or as part of a logical channel prioritization. As an example, the UE may accumulate tokens, e.g., increase or increment the count value, based on a factor such as an amount of time having passed. A UE (e.g., a MAC entity of the UE) may maintain a token count value, e.g., which may be referred to as Bj. The UE may initialize Bj of the logical channel to zero when the logical channel is established. For each logical channel j, the UE may increment Bj by the product prioritized bit rate (PBR)×T before every instance of the LCP procedure, where T is the time elapsed since Bj was last incremented. In some aspects, once the token count value reaches a maximum number, the UE may stop increasing the count. For example, if the value of Bj is greater than a bucket size (i.e. PBR× BSD), the UE may set Bj to the bucket size. When the UE has a transmission, the UE may determine whether the current count value for a logical channel meets a threshold. If so, the UE may allocate uplink resources (e.g., in a priority order and/or residual delay budget order as described herein) and may decrement the token count. If the current count value of the logical channel does not meet the threshold, the UE may not allocate uplink resources for the logical channel. The UE (e.g., the MAC entity of the UE) may, when a new transmission is performed, the UE may allocate resources to the logical channels in a decreasing priority order for logical channels selected for the UL grant and having Bj>0. The UE may then decrement Bj by the total size of MAC SDUs served to logical channel j. The use of the token count to determine whether to allocate resources to a logical channel may help to regulate traffic among the logical channels.

Figure 7:
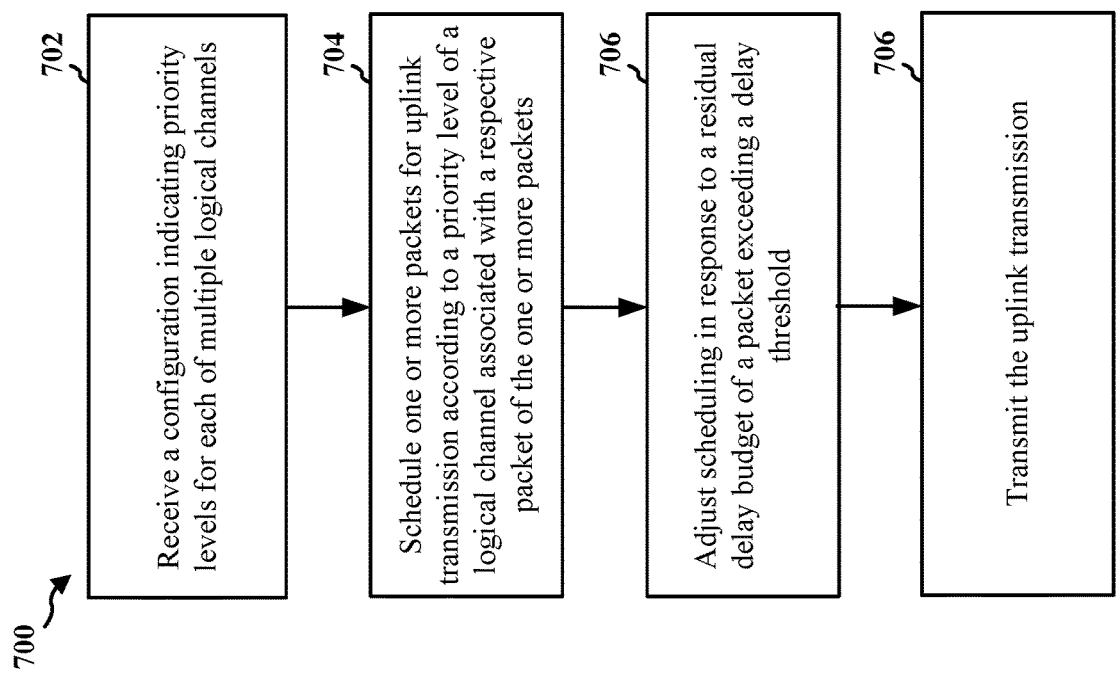
FIG. 7 is a flowchart of a method of wireless communication at a UE in accordance with aspects presented herein.

FIG. 7 is a flowchart 700 of a method of wireless communication. The method may be performed by a UE (e.g., the UE 104, 350, 402, 602; the apparatus 804). The method may enable a UE to handle flows having various delay budgets and priority levels through an LCP that is based on priority and takes into consideration a residual delay budget.

At 702, the UE receives a configuration indicating priority levels for each of multiple logical channels. The reception of the configuration may be performed, e.g., by the LCP component 198, the transceiver 822, and/or the antenna 880. In some aspects, the configuration may further include delay thresholds for each of at least a subset of the multiple logical channels, the delay thresholds being based on the residual delay budget.

At 704, the UE schedules one or more packets for uplink transmission according to a priority level of a logical channel associated with a respective packet of the one or more packets. The scheduling may be performed, e.g., by the LCP component 198.

At 706, the UE adjusts scheduling in response to a residual delay budget of a packet exceeding a delay threshold. The scheduling may be performed, e.g., by the LCP component 198. In some aspects, adjusting the scheduling may include switching scheduling decisions among the multiple logical channels from a priority basis to a residual delay budget basis in response to the residual delay budget of at least one packet exceeding the delay threshold. FIG. 4 illustrates an example of switching between a priority based scheduling to a delay based scheduling. Adjusting the scheduling may further includes scheduling at least one delayed packet having the residual delay budget that has exceeded the delay threshold before scheduling remaining packets having the residual delay budget that is within the delay threshold. Scheduling the at least one delayed packet having the residual delay budget that has exceeded the delay threshold may include scheduling a first packet having a smaller residual delay budget before scheduling a second packet having a longer residual delay budget. In some aspects, the UE may return to the priority based scheduling in response to the residual delay budget of each packet being within the delay threshold.

In some aspects, adjusting the scheduling may include moving a buffered packet from a first buffer to a second buffer in response to the residual delay budget for the buffered packet exceeding the delay threshold, the first buffer having a higher priority than the second buffer. FIGS. 5 and 6 illustrate example aspects of a UE moving a packet to a higher priority buffer in response to the residual delay budget for the packet falling below the delay threshold. The UE may queue the buffered packet within the second buffer based on the residual delay budget for the packet. The first buffer and the second buffer may be for a MAC layer, an RLC layer, or a PDCP buffer. In some aspects, the UE may transmit a delay status report in response to moving the packet to the second buffer. The UE may update a token count used in a traffic regulator configured for the logical channel associated with the first buffer in response to a transmission of the packet.

At 708, the UE transmits the uplink transmission. The transmission may be performed, e.g., by the LCP component 198, the transceiver 822, and/or the antenna 880. FIG. 4 and FIG. 6 illustrate example aspects of a UE transmitting an uplink transmission.

Figure 8:
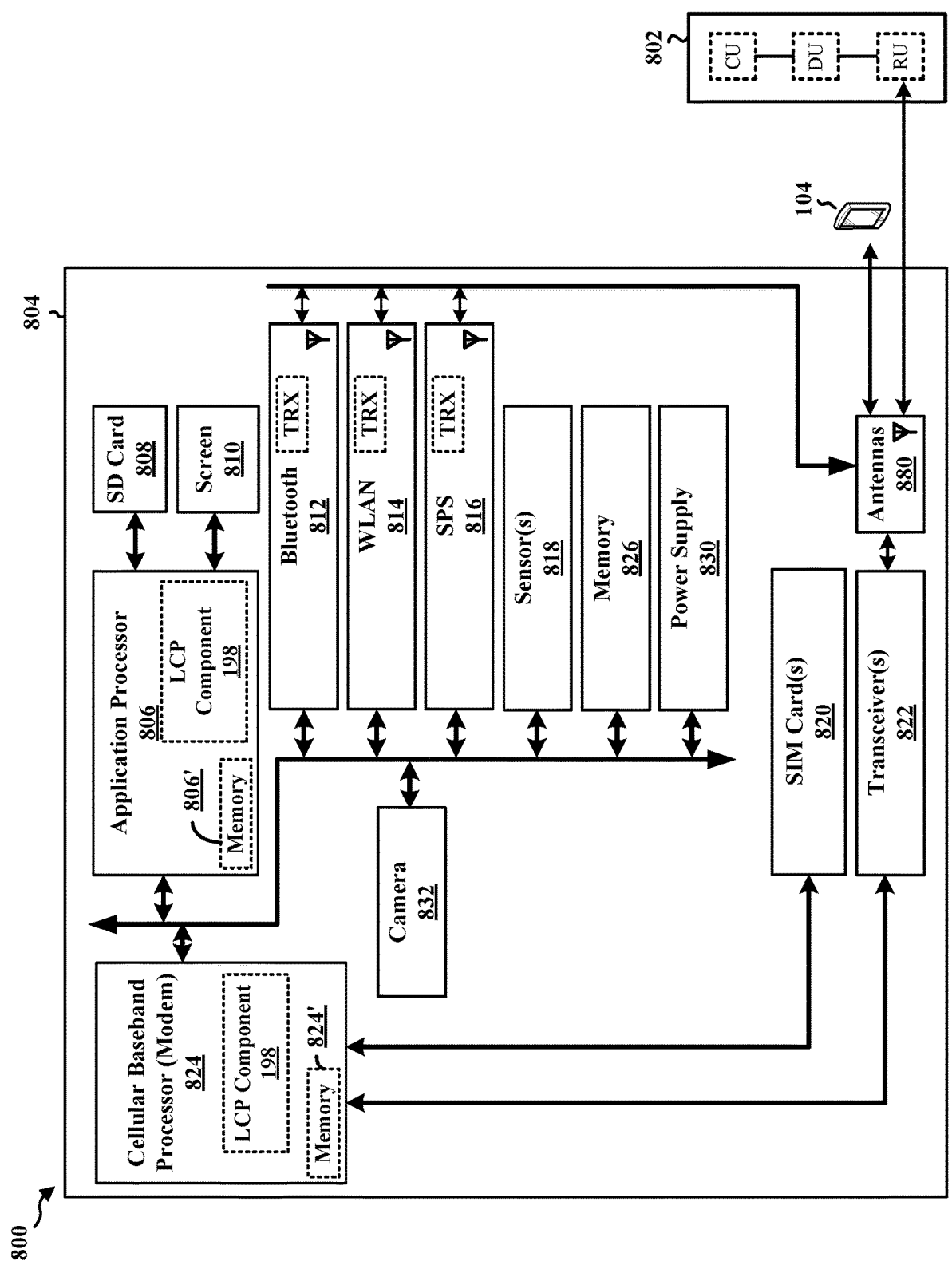
FIG. 8 is a diagram illustrating an example of a hardware implementation for an example apparatus and/or UE.

FIG. 8 is a diagram 800 illustrating an example of a hardware implementation for an apparatus 804. The apparatus 804 may be a UE, a component of a UE, or may implement UE functionality. In some aspects, the apparatus 804 may include a cellular baseband processor 824 (also referred to as a modem) coupled to one or more transceivers 822 (e.g., cellular RF transceiver). The cellular baseband processor 824 may include on-chip memory 824'. In some aspects, the apparatus 804 may further include one or more subscriber identity modules (SIM) cards 820 and an application processor 806 coupled to a secure digital (SD) card 808 and a screen 810. The application processor 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SO- NAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor 824 communicates through the transceiver(s) 822 via one or more antennas 880 with the UE 104 and/or with an RU associated with a network entity 802. The cellular baseband processor 824 and the application processor 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor 824 and the application processor 806 are each responsible for general processing, including the execution of software stored on the computer-readable medium/memory. The software, when executed by the cellular baseband processor 824/application processor 806, causes the cellular baseband processor 824/application processor 806 to perform the various functions described supra. The computer-readable medium/memory may also be used for storing data that is manipulated by the cellular baseband processor 824/application processor 806 when executing software. The cellular baseband processor 824/application processor 806 may be a component of the UE 350 and may include the memory 360 and/or at least one of the TX processor 368, the RX processor 356, and the controller/processor 359. In one configuration, the apparatus 804 may be a processor chip (modem and/or application) and include just the cellular baseband processor 824 and/or the application processor 806, and in another configuration, the apparatus 804 may be the entire UE (e.g., see 350 of FIG. 3) and include the additional modules of the apparatus 804.

As discussed supra, the component 198 is configured to receive a configuration indicating priority levels for each of multiple logical channels; schedule one or more packets for uplink transmission according to a priority level of a logical channel associated with a respective packet of the one or more packets; adjust scheduling in response to a residual delay budget of a packet exceeding a delay threshold; and transmit the uplink transmission. The LCP component 198 may be further configured to switch scheduling decisions among the multiple logical channels from a priority basis to a residual delay budget basis in response to the residual delay budget of at least one packet exceeding the delay threshold. The LCP component 198 may be further configured to schedule at least one delayed packet having the residual delay budget that has exceeded the delay threshold before scheduling remaining packets having the residual delay budget that is within the delay threshold. The LCP component 198 may be further configured to return to the priority based scheduling in response to the residual delay budget of each packet being within the delay threshold. The LCP component 198 may be further configured to move a buffered packet from a first buffer to a second buffer in response to the residual delay budget for the buffered packet exceeding the delay threshold, the first buffer having a higher priority than the second buffer. The LCP component 198 may be further configured to queue the buffered packet within the second buffer based on the residual delay budget for the packet. The LCP component 198 may be further configured to transmit a delay status report in response to moving the packet to the second buffer. The LCP component 198 may be further configured to update a token count used in a traffic regulator configured for the logical channel associated with the first buffer in response to a transmission of the packet. The component 198 may be within the cellular baseband processor 824, the application processor 806, or both the cellular baseband processor 824 and the application processor 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 804 may include a variety of components configured for various functions. In one configuration, the apparatus 804, and in particular the cellular baseband processor 824 and/or the application processor 806, includes means for receiving a configuration indicating priority levels for each of multiple logical channels; means for scheduling one or more packets for uplink transmission according to a priority level of a logical channel associated with a respective packet of the one or more packets; means for adjusting scheduling in response to a residual delay budget of a packet exceeding a delay threshold; and means for transmitting the uplink transmission. The apparatus 804 may further include means for switching scheduling decisions among the multiple logical channels from a priority basis to a residual delay budget basis in response to the residual delay budget of at least one packet exceeding the delay threshold. The apparatus 804 may further include means for scheduling at least one delayed packet having the residual delay budget that has exceeded the delay threshold before scheduling remaining packets having the residual delay budget that is within the delay threshold. The apparatus 804 may further include means for returning to the priority based scheduling in response to the residual delay budget of each packet being within the delay threshold. The apparatus 804 may further include means for moving a buffered packet from a first buffer to a second buffer in response to the residual delay budget for the buffered packet exceeding the delay threshold, the first buffer having a higher priority than the second buffer. The apparatus 804 may further include means for queuing the buffered packet within the second buffer based on the residual delay budget for the packet. The apparatus 804 may further include means for transmitting a delay status report in response to moving the packet to the second buffer. The apparatus 804 may further include means for updating a token count used in a traffic regulator configured for the logical channel associated with the first buffer in response to a transmission of the packet. The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 9:
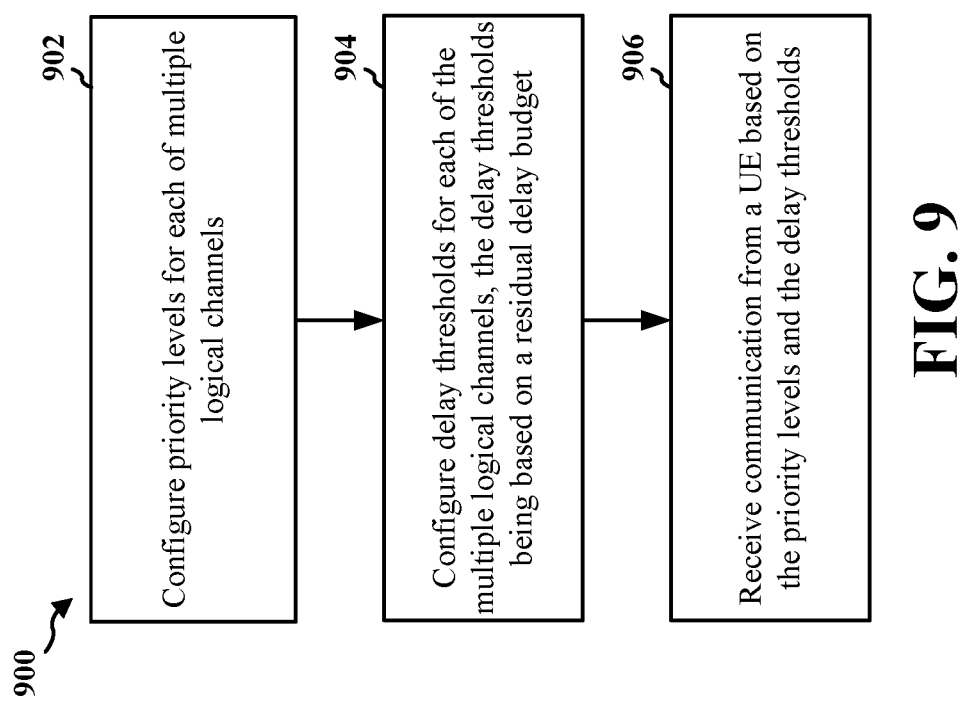
FIG. 9 is a flowchart of a method of wireless communication at a network node in accordance with aspects presented herein.

FIG. 9 is a flowchart 900 of a method of wireless communication. The method may be performed by a base station (e.g., the base station 102, 310, 404, 604; the network entity 802. The method may enable the handling of flows having various delay budgets and priority levels through an LCP that is based on priority and takes into consideration a residual delay budget.

At 902, the network node configures priority levels for each of multiple logical channels. The configuration may be performed, e.g., by the configuration component 199. FIGS. 4 and 6 illustrate examples of a network node configuring priority levels for LCHs.

At 904, the network node configures delay thresholds for each of the multiple logical channels, the delay thresholds being based on a residual delay budget. The configuration may be performed, e.g., by the configuration component 199. FIGS. 4 and 6 illustrate examples of a network node configuring delay thresholds for LCHs.

At 906, the network node receives communication from a UE based on the priority levels and the delay thresholds. The reception may be performed, e.g., by the communications interface 1018, 1038, or 1048. FIGS. 4 and 6 illustrate examples of a network node receiving communication from a UE based on the priority levels and the delay thresholds.

In some aspects, the network node may receive a delay status report in response to a packet being moved from a first buffer to a second buffer in response to the residual delay budget for the packet exceeding a delay threshold configured for a logical channel associated with the packet, the first buffer having a higher priority than the second buffer. The reception may be performed, e.g., by the communications interface 1018, 1038, or 1048.

Figure 10:
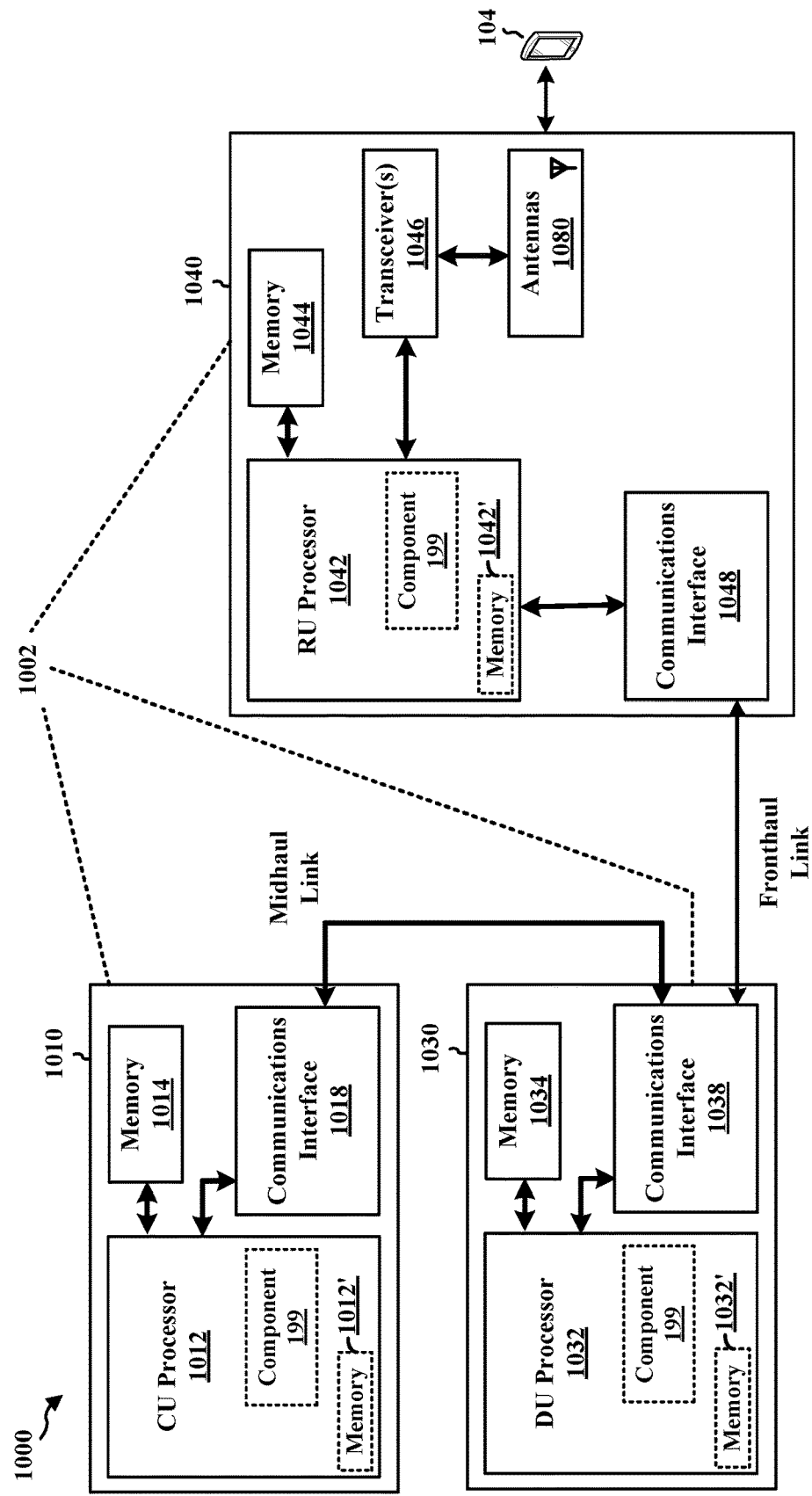
FIG. 10 is a diagram illustrating an example of a hardware implementation for an example network entity.

FIG. 10 is a diagram 1000 illustrating an example of a hardware implementation for a network entity 1002. The network entity 1002 may be a BS, a component of a BS, or may implement BS functionality. The network entity 1002 may include at least one of a CU 1010, a DU 1030, or an RU 1040. For example, depending on the layer functionality handled by the component 199, the network entity 1002 may include the CU 1010; both the CU 1010 and the DU 1030; each of the CU 1010, the DU 1030, and the RU 1040; the DU 1030; both the DU 1030 and the RU 1040; or the RU 1040. The CU 1010 may include a CU processor 1012. The CU processor 1012 may include on-chip memory 1012'. In some aspects, the CU 1010 may further include additional memory modules 1014 and a communications interface 1018. The CU 1010 communicates with the DU 1030 through a midhaul link, such as an F1 interface. The DU 1030 may include a DU processor 1032. The DU processor 1032 may include on-chip memory 1032'. In some aspects, the DU 1030 may further include additional memory modules 1034 and a communications interface 1038. The DU 1030 communicates with the RU 1040 through a fronthaul link. The RU 1040 may include an RU processor 1042. The RU processor 1042 may include on-chip memory 1042'. In some aspects, the RU 1040 may further include additional memory modules 1044, one or more transceivers 1046, antennas 1080, and a communications interface 1048. The RU 1040 communicates with the UE 104. The on-chip memory 1012', 1032', 1042' and the additional memory modules 1014, 1034, 1044 may each be considered a computer-readable medium/memory. Each computer-readable medium/memory may be non-transitory. Each of the processors 1012, 1032, 1042 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to configure priority levels for each of multiple logical channels; configure delay thresholds for each of the multiple logical channels, the delay thresholds being based on a residual delay budget; and receive communication from a UE based on the priority levels and the delay thresholds. The configuration component 199 may be further configured to receive a delay status report in response to a packet being moved from a first buffer to a second buffer in response to the residual delay budget for the packet exceeding a delay threshold configured for a logical channel associated with the packet, the first buffer having a higher priority than the second buffer. The component 199 may be within one or more processors of one or more of the CU 1010, DU 1030, and the RU 1040. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1002 may include a variety of components configured for various functions. In one configuration, the network entity 1002 includes means for configuring priority levels for each of multiple logical channels; means for configuring delay thresholds for each of the multiple logical channels, the delay thresholds being based on a residual delay budget; and means for receiving communication from a UE based on the priority levels and the delay thresholds. The network entity 1002 may further include means for receiving a delay status report in response to a packet being moved from a first buffer to a second buffer in response to the residual delay budget for the packet exceeding a delay threshold configured for a logical channel associated with the packet, the first buffer having a higher priority than the second buffer. The means may be the component 199 of the network entity 1002 configured to perform the functions recited by the means. As described supra, the network entity 1002 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, comprising: receiving a configuration indicating priority levels for each of multiple logical channels; scheduling one or more packets for uplink transmission according to a priority level of a logical channel associated with a respective packet of the one or more packets; adjusting scheduling in response to a residual delay budget of a packet exceeding a delay threshold; and transmitting the uplink transmission.

In aspect 2, the method of aspect 1 further includes that the configuration further includes delay thresholds for each of at least a subset of the multiple logical channels, the delay thresholds being based on the residual delay budget.

In aspect 3, the method of aspect 1 or aspect 2 further includes switching scheduling decisions among the multiple logical channels from a priority basis to a residual delay budget basis in response to the residual delay budget of at least one packet exceeding the delay threshold.

In aspect 4, the method of aspect 3 further includes scheduling at least one delayed packet having the residual delay budget that has exceeded the delay threshold before scheduling remaining packets having the residual delay budget that is within the delay threshold.

In aspect 5, the method of aspect 4 further includes that scheduling the at least one delayed packet having the residual delay budget that has exceeded the delay threshold includes scheduling a first packet having a smaller residual delay budget before scheduling a second packet having a longer residual delay budget.

In aspect 6, the method of any of aspects 3-5 further includes returning to the priority based scheduling in response to the residual delay budget of each packet being within the delay threshold.

In aspect 7, the method of aspect 1 further includes moving a buffered packet from a first buffer to a second buffer in response to the residual delay budget for the buffered packet exceeding the delay threshold, the first buffer having a higher priority than the second buffer.

In aspect 8, the method of aspect 7 further includes queuing the buffered packet within the second buffer based on the residual delay budget for the packet.

In aspect 9, the method of aspect 7 or aspect 8 further includes that the first buffer and the second buffer are for at least one of a MAC layer, a RLC layer, or a PDCP buffer.

In aspect 10, the method of any of aspects 7-9 further includes transmitting a delay status report in response to moving the packet to the second buffer.

In aspect 11, the method of any of aspects 7-10 further includes updating a token count used in a traffic regulator configured for the logical channel associated with the first buffer in response to a transmission of the packet.

Aspect 12 is an apparatus for wireless communication at a UE, comprising means to perform the method of any of aspects 1 to 11.

Aspect 13 is an apparatus for wireless communication at a UE, comprising: memory; and at least one processor coupled to the memory and configured to implement the method of any of aspects 1 to 11.

In aspect 14, the apparatus of aspect 12 or aspect 13 further includes at least one of a transceiver or an antenna.

Aspect 15 is non-transitory computer-readable medium storing computer executable code for wireless communication at a UE, the code when executed by a processor causes the processor to implement the method of any of aspects 1 to 11.

Aspect 16 is a method of wireless communication at a network node, comprising: configuring priority levels for each of multiple logical channels; configuring delay thresholds for each of the multiple logical channels, the delay thresholds being based on a residual delay budget; and receiving communication from a UE based on the priority levels and the delay thresholds.

In aspect 17, the method of aspect 16 further includes receiving a delay status report in response to a packet being moved from a first buffer to a second buffer in response to the residual delay budget for the packet exceeding a delay threshold configured for a logical channel associated with the packet, the first buffer having a higher priority than the second buffer.

Aspect 18 is an apparatus for wireless communication at a network node, comprising means to perform the method of aspect 16 or 17.

Aspect 19 is an apparatus for wireless communication at a network node, comprising: memory; and at least one processor coupled to the memory and configured to implement the method of aspect 16 or 17.

In aspect 20, the apparatus of aspect 18 or 19 further includes at least one of a transceiver or an antenna.

Aspect 21 is non-transitory computer-readable medium storing computer executable code for wireless communication at a network node, the code when executed by a processor causes the processor to implement the method of aspect 16 or 17.

What is claimed is:

1. A method of wireless communication at a user equipment (UE), comprising:
   receiving a configuration indicating priority levels for each of multiple logical channels;
   scheduling one or more packets for uplink transmission according to a priority level of a logical channel associated with a respective packet of the one or more packets;
   adjusting scheduling of the one or more packets for the uplink transmission in response to a residual delay budget of a packet exceeding a delay threshold; and
   transmitting the uplink transmission including at least one of the one or more packets based on the adjusted scheduling.

2. The method of claim 1, wherein the configuration further includes delay thresholds for each of at least a subset of the multiple logical channels, the delay thresholds being based on the residual delay budget.

3. The method of claim 1, wherein adjusting the scheduling includes:
   switching scheduling decisions among the multiple logical channels from a priority basis to a residual delay budget basis in response to the residual delay budget of at least one packet exceeding the delay threshold.

4. The method of claim 3, further comprising:
   scheduling at least one delayed packet having the residual delay budget that has exceeded the delay threshold before scheduling remaining packets having the residual delay budget that is within the delay threshold.

5. The method of claim 4, wherein scheduling the at least one delayed packet having the residual delay budget that has exceeded the delay threshold includes scheduling a first packet having a smaller residual delay budget before scheduling a second packet having a longer residual delay budget.

6. The method of claim 3, further comprising:
   returning to the priority basis for the scheduling decisions in response to the residual delay budget of each packet being within the delay threshold.

7. The method of claim 1, wherein adjusting the scheduling includes:
   moving a buffered packet from a first buffer to a second buffer in response to the residual delay budget for the buffered packet exceeding the delay threshold, the first buffer having a higher priority than the second buffer.

8. The method of claim 7, further comprising:
   queuing the buffered packet within the second buffer based on the residual delay budget for the packet.

9. The method of claim 7, wherein the first buffer and the second buffer are for at least one of a medium access control (MAC) layer, a radio link control (RLC) layer, or a Packet Data Convergence Protocol (PDCP) buffer.

10. The method of claim 7, further comprising:
    transmitting a delay status report in response to moving the packet to the second buffer.

11. The method of claim 7, further comprising:
    updating a token count used in a traffic regulator configured for the logical channel associated with the first buffer in response to a transmission of the packet.

12. An apparatus for wireless communication at a user equipment (UE), comprising:
    memory; and
    at least one processor coupled to the memory and configured to:
      receive a configuration indicating priority levels for each of multiple logical channels;
      schedule one or more packets for uplink transmission according to a priority level of a logical channel associated with a respective packet of the one or more packets;
      adjust scheduling of the one or more packets for the uplink transmission in response to a residual delay budget of a packet exceeding a delay threshold; and
      transmit the uplink transmission including at least one of the one or more packets based on the adjusted scheduling.

13. The apparatus of claim 12, wherein the configuration further includes delay thresholds for each of at least a subset of the multiple logical channels, the delay thresholds being based on the residual delay budget.

14. The apparatus of claim 12, wherein to adjusting the scheduling, the at least one processor is further configured to:
    switch scheduling decisions among the multiple logical channels from a priority basis to a residual delay budget basis in response to the residual delay budget of at least one packet exceeding the delay threshold.

15. The apparatus of claim 14, wherein the at least one processor is further configured to:
    schedule at least one delayed packet having the residual delay budget that has exceeded the delay threshold before scheduling remaining packets having the residual delay budget that is within the delay threshold.

16. The apparatus of claim 15, wherein to schedule the at least one delayed packet having the residual delay budget that has exceeded the delay threshold, the at least one processor is configured to schedule a first packet having a smaller residual delay budget before scheduling a second packet having a longer residual delay budget.

17. The apparatus of claim 14, wherein the at least one processor is further configured to:
    return to the priority basis for the scheduling decisions in response to the residual delay budget of each packet being within the delay threshold.

18. The apparatus of claim 12, wherein, to adjust the scheduling, the at least one processor is further configured to:
    move a buffered packet from a first buffer to a second buffer in response to the residual delay budget for the buffered packet exceeding the delay threshold, the first buffer having a higher priority than the second buffer.

19. The apparatus of claim 18, wherein the at least one processor is further configured to:
    queue the buffered packet within the second buffer based on the residual delay budget for the packet.

20. The apparatus of claim 18, wherein the first buffer and the second buffer are for at least one of a medium access control (MAC) layer, a radio link control (RLC) layer, or a Packet Data Convergence Protocol (PDCP) buffer.

21. The apparatus of claim 18, wherein the at least one processor is further configured to:
    transmit a delay status report in response to moving the packet to the second buffer.

22. The apparatus of claim 18, wherein the at least one processor is further configured to:
    update a token count used in a traffic regulator configured for the logical channel associated with the first buffer in response to a transmission of the packet.

23. The apparatus of claim 12, further comprising:
    at least one transceiver coupled to the at least one processor and configured to receive the configuration and transmit the uplink transmission.

24. A method of wireless communication at a network node, comprising:
- configuring priority levels for each of multiple logical channels;
- configuring delay thresholds for each of the multiple logical channels, the delay thresholds being based on a residual delay budget;
- receiving a delay status report in response to a packet being moved from a first buffer to a second buffer in response to the residual delay budget for the packet exceeding a delay threshold configured for a logical channel associated with the packet, the first buffer having a higher priority than the second buffer; and
- receiving communication from a user equipment (UE) based on the priority levels and the delay thresholds.

25. An apparatus for wireless communication at a network node, comprising:
- memory; and
- at least one processor coupled to the memory and configured to:
  - configure priority levels for each of multiple logical channels;
  - configure delay thresholds for each of the multiple logical channels, the delay thresholds being based on a residual delay budget;
  - receive a delay status report in response to a packet being moved from a first buffer to a second buffer in response to the residual delay budget for the packet exceeding a delay threshold configured for a logical channel associated with the packet, the first buffer having a higher priority than the second buffer; and
  - receive communication from a user equipment (UE) based on the priority levels and the delay thresholds.

26. The apparatus of claim 25, further comprising:
- at least one transceiver coupled to the at least one processor and configured to transmit a configuration and receive the communication from the UE.

* * * * *